US008311796B2

(12) United States Patent
Kristensson et al.

(10) Patent No.: US 8,311,796 B2
(45) Date of Patent: Nov. 13, 2012

(54) SYSTEM AND METHOD FOR IMPROVING TEXT INPUT IN A SHORTHAND-ON-KEYBOARD INTERFACE (75) Inventors: Per-Ola Kristensson, Linkoping (SE); Shumin Zhai, San Jose, CA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 12/906,827

(22) Filed: Oct. 18, 2010

(65) Prior Publication Data
US 2011/0071834 A1   Mar. 24, 2011

Related U.S. Application Data (63) Continuation of application No. 11/256,713, filed on Oct. 22, 2005, now abandoned.

(51) Int. Cl.
G06F 17/20 (2006.01)
G06F 17/27 (2006.01)
G06F 17/21 (2006.01)
(52) U.S. Cl. .................. 704/1; 704/9; 704/10
(58) Field of Classification Search .................. None
See application file for complete search history.

(56) References Cited

U.S. PATENT DOCUMENTS

| 4,819,271 A | | 4/1989 | Bahl et al. |
|---|---|---|---|
| 5,574,482 A | * | 11/1996 | Niemeier ...................... 345/173 |
| 5,680,628 A | | 10/1997 | Carus et al. |
| 5,896,321 A | | 4/1999 | Miller et al. |
| 5,953,541 A | | 9/1999 | King et al. |
| 6,008,799 A | * | 12/1999 | Van Kleeck .................. 345/173 |
| 6,018,708 A | | 1/2000 | Dahan et al. |
| 6,175,834 B1 | | 1/2001 | Cai et al. |
| 6,223,059 B1 | | 4/2001 | Haestrup |
| 6,286,064 B1 | | 9/2001 | King et al. |
| 6,349,282 B1 | | 2/2002 | Van Aelten et al. |
| 6,401,060 B1 | | 6/2002 | Critchlow et al. |
| 6,438,545 B1 | | 8/2002 | Beauregard et al. |
| 6,801,893 B1 | | 10/2004 | Backfried et al. |
| 6,956,968 B1 | | 10/2005 | O'Dell et al. |
| 6,970,818 B2 | | 11/2005 | Menedez-Pidal et al. |
| 7,042,443 B2 | | 5/2006 | Woodard et al. |

(Continued)

FOREIGN PATENT DOCUMENTS

| EP | 1031913 A2 | 8/2000 |
|---|---|---|
| GB | 2193023 A | 1/1988 |

OTHER PUBLICATIONS

Cahill, L., "An Inheritance-based Lexicon for Message Understanding Systems," Procedures of the 4th Conference on Applied Natural Language Processing, 1994.

(Continued)

*Primary Examiner* — Jesse Pullias
(74) *Attorney, Agent, or Firm* — Perkins Coie LLP (57) ABSTRACT

A word pattern recognition system improves text input entered via a shorthand-on-keyboard interface. A core lexicon comprises commonly used words in a language; an extended lexicon comprises words not included in the core lexicon. The system only directly outputs words from the core lexicon. Candidate words from the extended lexicon can be outputted and simultaneously admitted to the core lexicon upon user selection. A concatenation module enables a user to input parts of a long word separately. A compound word module combines two common shorter words whose concatenation forms a long word.

12 Claims, 9 Drawing Sheets

U.S. PATENT DOCUMENTS

| | | | |
|---|---|---|---|
| 7,088,345 | B2 | 8/2006 | Robinson et al. |
| 7,092,567 | B2 | 8/2006 | Ma et al. |
| 7,120,582 | B1 | 10/2006 | Young et al. |
| 7,129,932 | B1 | 10/2006 | Klarlund et al. |
| 7,158,678 | B2 | 1/2007 | Nagel et al. |
| 7,199,786 | B2 | 4/2007 | Suraqui |
| 7,251,367 | B2 | 7/2007 | Zhai |
| 7,293,231 | B1 | 11/2007 | Gunn et al. |
| 7,376,938 | B1* | 5/2008 | Van der Hoeven ........... 717/136 |
| 7,380,203 | B2* | 5/2008 | Keely et al. ................... 715/230 |
| 7,487,461 | B2 | 2/2009 | Zhai et al. |
| 7,706,616 | B2 | 4/2010 | Kristensson et al. |
| 2004/0140956 | A1* | 7/2004 | Kushler et al. ................ 345/168 |
| 2004/0155869 | A1* | 8/2004 | Robinson et al. ............. 345/168 |
| 2005/0283364 | A1 | 12/2005 | Longe et al. |
| 2007/0024589 | A1* | 2/2007 | Fux et al. ...................... 345/171 |
| 2007/0094024 | A1 | 4/2007 | Kristensson et al. |

OTHER PUBLICATIONS

International Search Report and Written Opinion for International Application No. PCT/EP2006/067338, Mail Date Apr. 4, 2007, 12 pages.

Karttunen, L., "Finite-State Lexicon Compiler," Technical Report ISLT-NLTT2993-04-02, Xerox Palo Alto Research Center, Apr. 1993.

Kristensson, P., "Breaking the Laws of Action in the User Interface," pp. 1120-1121, CHI 2005.

Kristensson, P., et al., "Relaxing Stylus Typing Precision by Geometric Pattern Matching," pp. 151-158, IUI 2005.

Kristensson, P., et al., "SHARK2: A Large Vocabulary Shorthand Writing System for Pen-based Computers," UIST 2004, vol. 6, Issue 2, pp. 43-52, 2004.

Pusateri, E., et al., "N-best List Generation using Word and Phoneme Recognition Fusion," Proc. EUROSPEECH 2001, Sep. 3-7, 2001, 4 pages.

Seneff, S., et al., "Empowering End Users to Personalize Dialogue Systems through Speech Interaction," Proc. EUROSPEECH 2003, Sep. 1-4, 2003, 4 pages.

Stocky, T., et al., "A Commonsense Approach to Predictive Text Entry," pp. 1163-1166, CHI 2004, Apr. 24-29, 2004.

Young, S.R., "Detecting miscrecognitions and out-of-vocabulary words," pp. 21-24, IEEE 1994, Apr. 19-22, 1994.

* cited by examiner

SYSTEM AND METHOD FOR IMPROVING TEXT INPUT IN A SHORTHAND-ON-KEYBOARD INTERFACE

CROSS-REFERENCE TO RELATED APPLICATIONS

This application is a continuation of and claims priority to U.S. patent application Ser. No. 11/256,713, filed Oct. 22, 2005, now abandoned titled "SYSTEM AND METHOD FOR IMPROVING TEXT INPUT IN A SHORTHAND-ON-KEYBOARD INTERFACE," the entirety of which is incorporated by reference herein. This application also relates to the following co-pending U.S. patent applications: Ser. No. 10/325,197, titled "System and Method for Recognizing Word Patterns Based on a Virtual Keyboard Layout," Ser. No. 10/788,639, titled "System and Method for Recognizing Word Patterns in a Very Large Vocabulary Based on a Virtual Keyboard Layout," and Ser. No. 11/121,637, titled "System and Method for Issuing Commands Based on Pen Motion on a Graphical Keyboard," all of which are assigned to the same assignee as the present application, and are incorporated herein by reference.

FIELD OF THE INVENTION

The present invention generally relates to lexicon-based text entry and text prediction systems. More specifically, the present invention relates to text entry using shorthand-on-keyboard, an efficient method of entering words by drawing geometric patterns on a graphical on-screen keyboard.

BACKGROUND OF THE INVENTION

Shorthand on graphical keyboards (hereafter "shorthand-on-keyboard") or Shorthand on a Keyboard as Graph (sokgraph), represent an input method and system for efficiently entering text without a physical keyboard, typically using a stylus. Shorthand-on-keyboard enables the user to trace letter or functional keys on the graphical keyboard to enter words and commands into a computer. Experienced users partly or completely memorize the geometric patterns of frequently used words and commands on the keyboard layout and may draw these patterns based on memory recall using, for example, a digital pen.

Word-level recognition-based text entry systems such as shorthand-on-keyboard and handwriting/speech recognition as well as text prediction systems all rely on some form of lexicon that defines the set of words that these systems recognize. The input of the user is matched against choices in the lexicon. Words not included in the lexicon are usually not automatically recognized. In such a case, a special mode has to be provided. For example, in shorthand-on-keyboard the user may initially check a candidate list (N-best list). If no choice on the candidate list is the intended word, the user decides if the patterns drawn were incorrect. If the patterns drawn were correct, the user realizes the word intended is not in the lexicon. The user then enters the new word in the lexicon by tapping the individual letters. Ideally, the lexicon comprises all words a particular user needs to write, no more no less. A lexicon that is either too large or too small can introduce problems to the user.

A larger lexicon could present certain challenges, since it tends to reduce the recognition accuracy due to the likelihood of a greater number of distracters for each user input. In any language, there tends to be a core set of vocabulary that is common to all individuals. Beyond this core set, vocabulary tends to be specialized for a particular individual. For instance, an engineer may compose emails comprising highly technical terms and abbreviations for a particular field or business area. For other users, these specialized terms can be irrelevant and can introduce noise in the recognition process, making the recognition process less robust.

A smaller lexicon is typically a more robust lexicon in that user input is more likely to be correctly recognized, provided the intended word is in the lexicon. A smaller lexicon provides more flexibility and tolerance for the input of the user, allowing the input to be imprecise and inaccurate compared to the ideal form of the intended input choice. A further advantage of a small lexicon is that the search space is smaller. Consequently, a small lexicon allows reduction in the latency of a search. This is especially important in mobile devices where processing power is severely limited.

However, when a small lexicon does not contain the word the user needs, the user experience can be frustrating. A user does not know, prior to entry, whether a word is in the lexicon, causing uncertainty for the user. The lack of recognition of a word by a conventional system can occur either when the word is input incorrectly or when the word is not in the lexicon. Consequently, it can be difficult for the user to determine why a word is not recognized. In general, the user cannot know whether a word is in the lexicon except by repeatedly trying the word. When the user is certain that the word is not in the lexicon, the user adds that word to the lexicon via an interface provided by the recognition system by tapping as described earlier. A smaller lexicon requires a user to add words to the lexicon more often.

There are several conventional solutions to the lexicon size issue. A commonly used method is to use a large lexicon and then take advantage of higher order language regularities such as a word-level trigram-model to filter out highly unlikely candidates. The downside of a language model approach is generally the overhead of creating and making efficient use of a large language model. Moreover, a language model can introduce errors and mistakenly filter out the intended words. This is especially true if the language model is generic rather than customized to a particular user. In practice, efficient customization of a language model is difficult. Furthermore, a language model is difficult to integrate with a recognition technique that already has a high precision, such as shorthand-on-keyboard.

An alternative conventional approach creates a customized lexicon for a user by mining the written text generated by the user, for example, written emails and other documents. Although this approach does result in a lexicon more closely tailored to a specific user, a previously written corpus generated by a user may be to be too small to cover all of the desired words. Furthermore, in practice, it is difficult to write a computer program code that can open and read all and various email and document formats that the user may be using. This approach often requires the user to locate and select the previous written documents, which is inconvenient for the user. A customized lexicon may also be difficult to carry over across different devices.

Although these conventional solutions are adequate for their intended purpose, it is desirable to find a solution that enables a lexicon to have a relatively small number of irrelevant distracters to the user's desired input and yet allows easy access to almost all words the user may need, including more specialized words that are infrequently used by most users. Overall, there is a desire to include all words possibly needed by the user in a very large lexicon. However a very large lexicon implies that more words match the pattern drawn on the keyboard given the same matching threshold, reducing the signal-to-noise ratio in the input system. Consequently, a larger lexicon corresponds to less flexibility and robustness to the user. Thus, there is a need for a lexicon configuration for a shorthand-on-keyboard system that balances ease of use with flexibility and robustness.

Another challenge to a conventional shorthand-on-keyboard input method is a requirement of entering text exactly at the word level, one word at a time. Some words are long. For relatively new users, it can be cognitively difficult to draw a long word with shorthand-on-keyboard in one stroke. This difficulty is particularly acute in some European languages in which compound long words are more common than in English. Furthermore, a user can find entry more convenient if common affixes can be drawn as a separate stroke from the stem of the word. For example, to write the word "working" with shorthand-on-keyboard, the user may wish to draw the pattern of w-o-r-k on a graphical keyboard, then draw i-n-g and combine the two into one word. Thus, there is a need for an effective system and method to automatically combine partial words on the keyboard ("sokgraphs") into one word as intended by the user.

What is therefore needed is a system, a computer program product, and an associated method for a system and method for improving text input in a shorthand-on-keyboard interface. The need for such a solution has heretofore remained unsatisfied.

SUMMARY OF THE INVENTION

The present invention satisfies this need, and presents a system, a computer program product, and an associated method (collectively referred to herein as "the system" or "the present system") for improving text input in a shorthand-on-keyboard interface. The present system comprises a core lexicon and an extended lexicon. The core lexicon comprises commonly used words in a language. The core lexicon typically comprises approximately 5,000 to 15,000 words, depending on an application of the present system. The extended lexicon comprises words not included in the core lexicon. The extended lexicon comprises approximately 30,000 to 100,000 words.

The core lexicon allows the present system to target commonly used words in identifying a gesture as a highest-ranked candidate word, providing more robust recognition performance associated with a smaller lexicon. Only words from the core lexicon can be directly outputted in the present system. Additional candidate words are available from the extended lexicon, allowing a user to find lesser-known words on the candidate list, but only through menu selection. The present system enhances word recognition accuracy without sacrificing selection of words from a large lexicon. The core lexicon provides more flexibility and tolerance for the input of the user to be imprecise and inaccurate from the ideal form of the intended input choice.

The present system further comprises a recognition module, a pre-ranking module, and a ranking module. The recognition module generates an N-best list of candidate words corresponding to an input pattern. The pre-ranking module ranks the N-best candidate words according to predetermined criteria. The ranking module adjusts ranking of the N-best list of candidate words to place words drawn from the core lexicon higher than words drawn from the extended lexicon, generating a ranked list of word candidates. Only words in the core lexicon are presented as output by the present system. The present system lists candidate words found in the extended lexicon only in the N-best list; these words require user selection to become output. Once selected by a user from the N-best list, a word from the extended lexicon is admitted to the core lexicon.

More specifically, in a preferred embodiment, only words in the core lexicon are outputted by the recognition system. Words in the extended lexicon can only be listed in the N-best list and need explicit user selection to be outputted. Once selected, the words in the extended lexicon also gets admitted to the core lexicon.

The present system reduces the overhead inflicted upon the user in the case the word gestured by the user is not in the vocabulary of the core lexicon. Instead of being unsure whether the word is included in the lexicon or if the system misrecognized the input, the user can scan the N-best list and select the desired candidate word.

The present system further comprises a concatenation module and a compound word module. The concatenation module enables a user to input parts of a long word separately; the present system automatically combines words and part-of-words that are partial "sokgraphs" into one word that is intended by the user. Word parts can be stems, such as "work" and affixes, such as "ing" or "pre". The compound word module combines two or more common shorter words whose concatenation forms a long word, such as short+hand in English. The concatenation of several short words into one compound word is more common in some European languages such as Swedish or German.

The present system allows user interaction to adjust concatenation of a word 1 and a word 2 and decoupling of a combined word. When the user clicks on a concatenated word, for example "smokefree", a menu option "split to "smoke free"" or an equivalent option is given to the user. Alternatively a pen trace motion, such as a downward motion crossing the word smokefree, can be defined as a split command. For concatenable words with no action due to low confidence, a menu option is embedded in word 1 and word 2. When the user clicks on word 1, the option "snap to right" or an equivalent option is selectable. When the user clicks on word 2, the option "snap to left" or an equivalent option is selectable. Alternatively a pen gesture, such as a circle crossing both word 1 and word 2, is defined as the command to join the two words as one concatenated long word.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Lexicon: a collection of elements defining the recognizable elements that can be matched against a user's input in a recognition system.

PDA: Personal Digital Assistant. A pocket-sized personal computer. PDAs typically store phone numbers, appointments, and to-do lists. Some PDAs have a small keyboard; others have only a special pen that is used for input and output on a virtual keyboard.

Sokgrah: Shorthand on a Keyboard as a Graph. A pattern representation of words on a virtual keyboard.

Virtual Keyboard: A computer simulated keyboard with touch-screen interactive capability that can be used to replace or supplement a keyboard using keyed entry. The virtual keys are typically tapped serially with a stylus. It is also called graphical keyboard, on-screen keyboard, or stylus keyboard.

Figure 1:
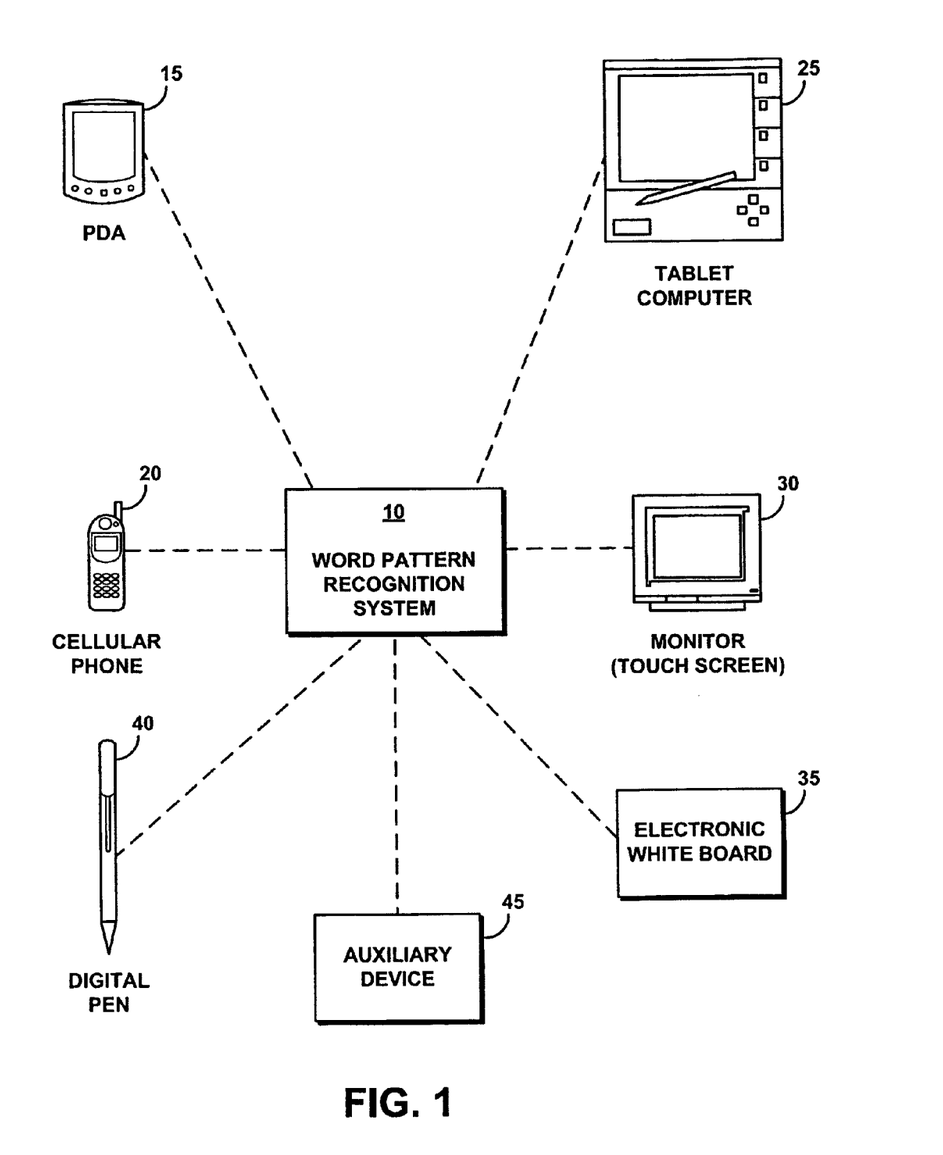
FIG. 1 is a schematic illustration of an exemplary operating environment in which a word pattern recognition system of the present invention can be used.

FIG. 1 portrays an exemplary overall environment in which a system, a computer program product, and an associated method for improving text input in a shorthand-on-keyboard interface (the word pattern recognition system 10 or the "system 10") according to the present invention may be used. System 10 includes a software program code or a computer program product that is typically embedded within, or installed on a computer. The computer in which system 10 is installed can be a mobile device such as a PDA 15 or a cellular phone 20. System 10 can also be installed in devices such as tablet computer 25, touch screen monitor 30, electronic white board 35, and digital pen 40.

System 10 can be installed in any device using a virtual keyboard or similar interface for entry, represented by auxiliary device 45. System 10 can be saved on a suitable storage medium such as a diskette, a CD, a hard drive, or like devices.

System 10 determines a word from the shape and location of a pen stroke formed by a user on a graphical keyboard. System 10 sends the determined words to a software recipient such as, for example, an application, an operating system, etc.

Figure 2:
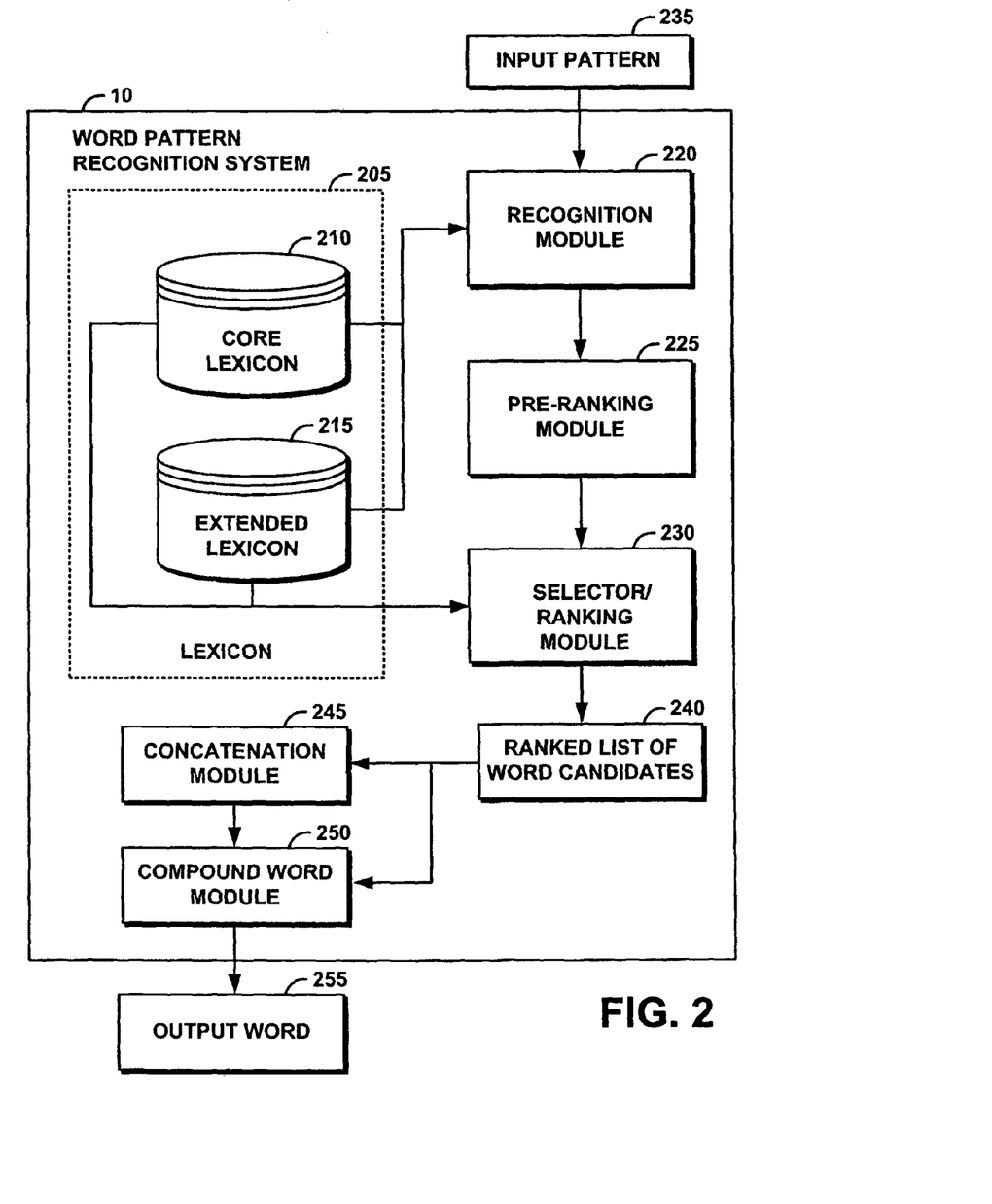
FIG. 2 is a block diagram of a high-level architecture of the word pattern recognition system of FIG. 1.

FIG. 2 illustrates a high-level hierarchy of system 10. System 10 comprises a lexicon 205. The lexicon 205 comprises a core lexicon 210 and an extended lexicon 215. The core lexicon 210 comprises commonly used words in a language. The core lexicon 210 typically comprises approximately 5,000 to 15,000 words, depending on an application of system 10. The extended lexicon 215 comprises words not included in the core lexicon 215. The extended lexicon 215 comprises approximately 30,000 to 100,000 words.

System 10 further comprises a recognition module 220, a pre-ranking module 225, and a selector/ranking module 230. The recognition module 220 generates an N-best list of candidate words corresponding to an input pattern 235. The pre-ranking module 225 ranks the N-best candidate words according to predetermined criteria. The ranking module 230 adjusts ranking of the N-best list of candidate words to place words drawn from the core lexicon 210 higher than words drawn from the extended lexicon 215, generating a ranked list of word candidates 240. As explained earlier, words drawn from the extended lexicon are not outputted; only words from the core lexicon are outputted.

System 10 further comprises a concatenation module 245 and a compound word module 250. The concatenation module 245 concatenates words selected from the ranked list of word candidates 240; e.g., concatenating "ing" with "code" to form "coding". The compound word module 250 combines words selected from the ranked list of word candidates 240 into larger words. An output word 255 is a word selected from the ranked list of word candidates 240 and processed by the concatenation module 245 and the compound word module 250, as necessary. Only words in the core lexicon 210 are presented as the output word 255 by system 10. System 10 lists candidate words found in the extended lexicon 215 only in the N-best list; these words require user selection to become the output word 255. Once selected by a user, system 10 admits a word from the extended lexicon 215 to the core lexicon 210.

System 10 adapts recognition of the input pattern 235 by the recognition module 220 to the vocabulary of the user while maintaining maximum signal to noise ratio in the recognition system. System 10 allows the core lexicon 210 and the extended lexicon 215 to participate in the recognition process of the recognition module 220. However, only words in the core lexicon 210 directly enter output of the recognition module 220; these words are a default output. Words in the extended lexicon 215 that match the input pattern 235 are only listed in an "N-best" list for selection by the user. When a user selects one of these candidate words from the N-best list to replace the default output, the selected word is admitted to core lexicon 210. After a word is admitted to the core lexicon 210, the admitted word can directly enter the output of the recognition module when the word matches the input pattern 235.

Figure 3:
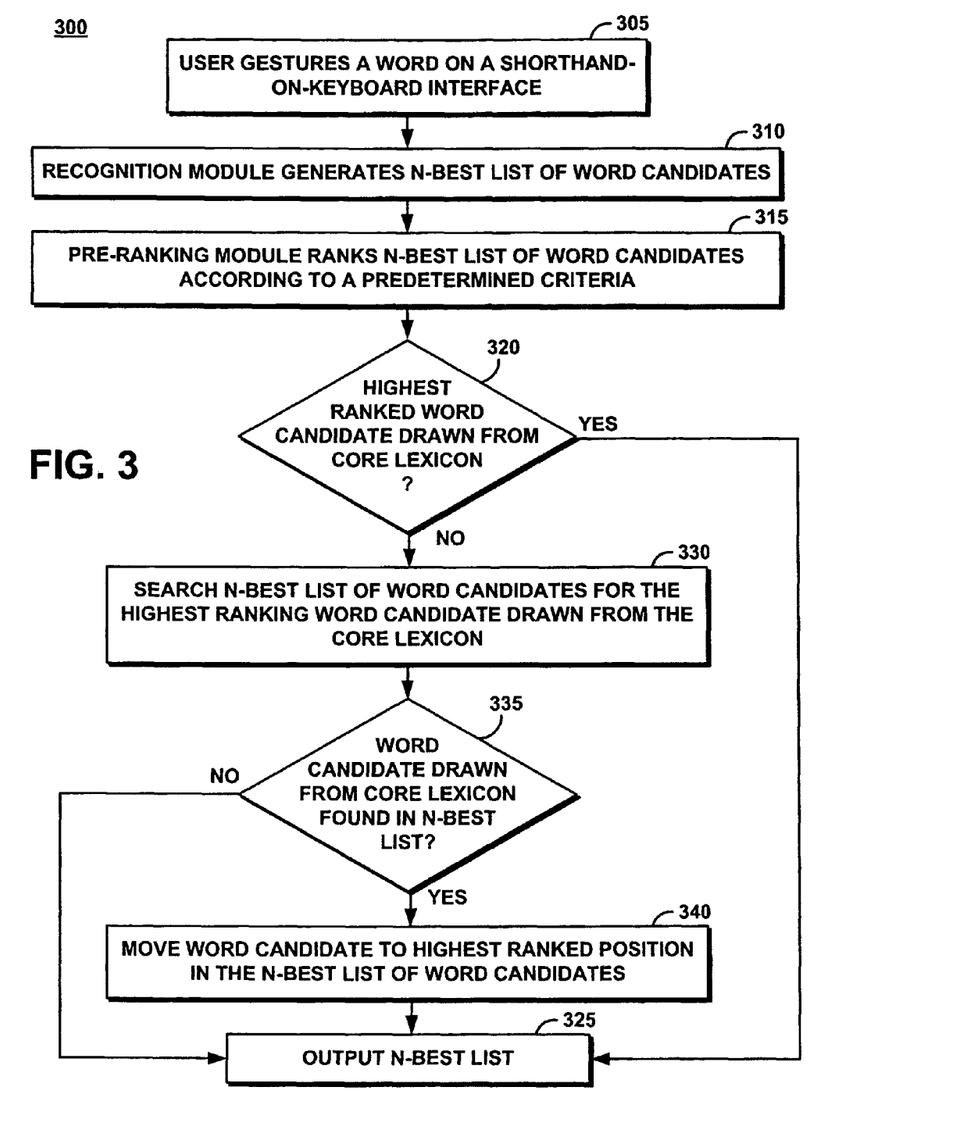
FIG. 3 is a process flow chart illustrating a method of operation of the word pattern recognition system of FIGS. 1 and 2 in ranking candidate words according to location in a core lexicon or an extended lexicon.

FIG. 3 illustrates a method 300 of system 10 in generating an N-best list of candidates that match the input pattern 235. The user gestures a word on a shorthand-on-keyboard interface (step 305). The recognition module 220 generates an N-best list of word candidates (step 310); the pre-ranking module 225 ranks the N-best list of word candidates from the core lexicon 210 and the extended lexicon 215 according to a criterion such as a confidence value or a similarity measure (step 315).

The ranking module 230 determines whether the highest ranked word in the N-best list of candidate words is drawn from the core lexicon 210 (decision step 320). If yes, the ranking module 230 outputs the ranked N-best list of word candidates as the ranked list of word candidates 240 (step 325). If the highest ranked candidate in the N-best list of candidate words is not present in the core lexicon 210, the ranking module 230 searches the N-best list of candidate words to locate the highest ranking word candidate drawn from the core lexicon 210 (step 330).

If a word candidate drawn from the core lexicon 210 is not found in the N-best list of candidate words (decision step 335), the ranking module 230 outputs the ranked N-best list of word candidates as the ranked list of word candidates 240. Otherwise, the ranking module 230 moves the found word candidate to the highest-ranking position in the N-best list of word candidates (step 335). The ranking module outputs the ranked N-best list of word candidates as the ranked list of word candidates 240 (step 340).

To allow users to select a candidate word that is not highest ranked, a user interface component displays the next best candidate list (N-best list) from which a user can see alternative candidate words that closely match the input pattern 235. In one embodiment, the position of a candidate word on the list is determined by a rank associated with the candidate word independent of whether the candidate word is found in the core lexicon 210 or the extended lexicon 215, with the exception of the highest ranked word must always be found in the core lexicon with the exception when no word in the core lexicon matches the user's input. In another embodiment, candidate words are grouped by lexicon origin; i.e., candidate words from the core lexicon 210 are grouped together and candidate words from the extended lexicon 215 are grouped together.

The origin of the candidate words can optionally be indicated by emphasizing different perceptual features that are associated with the candidate words, to facilitate the recognition of the source of the candidate words, e.g., from the core or extended lexicon. Exemplary perceptual features include, for example: color, background shading, bold font, italicized font, etc. If a user selects no word, system 10 outputs the highest ranked word in the N-best list of candidate words from the core lexicon. If a user does not select a word, system 10 outputs the highest ranked word in the N-best list of candidate words from the core lexicon.

Words drawn from the extended lexicon 215 are accessed from the N-best list of candidate words. Consequently, error tolerance of system 10 in generating the highest-ranked candidate is greatly enhanced, since the highest-ranked candidate that is displayed by the system is drawn from the smaller core lexicon 210. In rare situations in which the desired word is not found in the core lexicon 210, the user activates the N-best list and selects the desired candidate.

Figure 4:
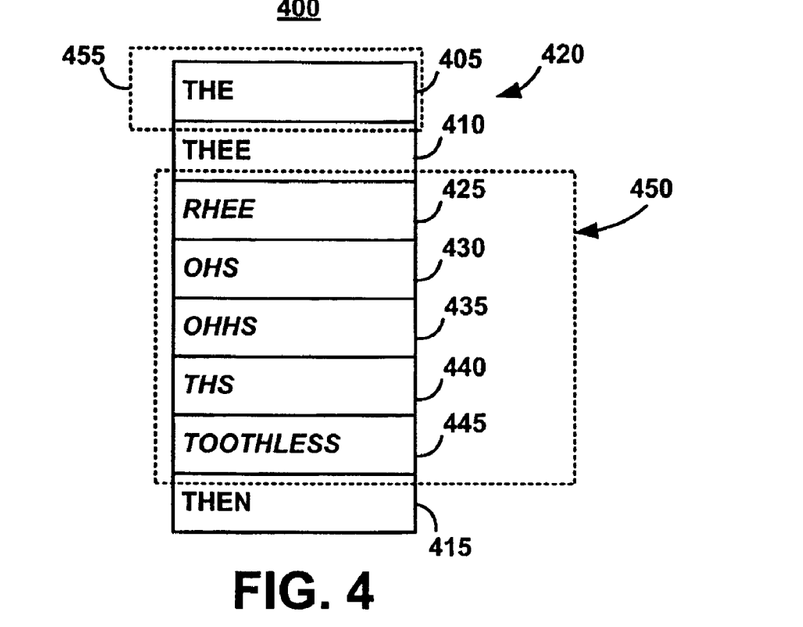
FIG. 4 is a diagram illustrating an N-best list generated by the word pattern recognition system of FIGS. 1 and 2 in which words from the core lexicon and words from the extended lexicon are displayed differently.

FIG. 4 illustrates an exemplary N-best list of candidate words 400 generated by the ranking module 230. Candidate words from the core lexicon 210 comprise candidate word 1, 405, candidate word 2, 410, and candidate word 3, 415, collectively referenced as core candidate words 420. Candidate words from the extended lexicon 215 comprise candidate word 4, 425, candidate 5, 430, candidate word 6, 435, candidate word 7, 440, and candidate word 8, 445, collectively referenced as extended candidate words 450. Core candidate words 420 and extended candidate words 450 are displayed with different emphasis.

In this example, core candidate words 420 are shown in bold text and extended candidate words 450 are shown in italicized text. Any form of emphasis may be used to differentiate the core candidate words 420 and the extended candidate words 450 such as, for example, text color, color background, shading, etc. The candidate words in the exemplary N-best list of candidate words 400 are positioned according to rank given by the recognition module 220, with the exception of the top word candidate position 455 that is reserved for a word drawn from the core lexicon 210 unless no word from the core lexicon matches the user's input, in which case top word candidate position 455 may be taken by a word from the extended lexicon.

Figure 5:
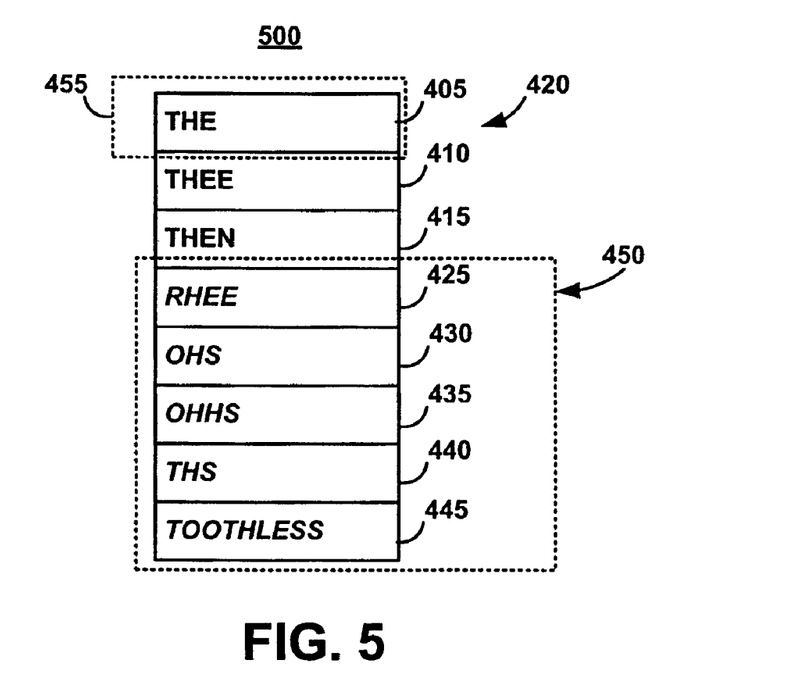
FIG. 5 is a diagram illustrating an N-best list generated by the word pattern recognition system of FIGS. 1 and 2 in which words from the core lexicon are grouped and ranked higher than words from the extended lexicon.

FIG. 5 illustrates one embodiment in which an exemplary N-best list 500 comprises candidate words ranked according to source and according to ranking criteria provided by the recognition module 220. As for FIG. 4, core candidate words 420 and extended candidate words 450 are displayed with different emphasis. In this example, core candidate words 420 are shown in bold text and extended candidate words 450 are shown in italicized text.

System 10 greatly reduces the overhead inflicted upon the user in the case the word gestured by the user is not in the vocabulary of the core lexicon 210. Instead of being unsure whether the word is included in the core lexicon 210 or if the system misrecognized the input, the user can scan the N-best list and select the desired candidate word.

For those familiar with the state of the art, it should be apparent that the division of words into separate lexicons is one implementation that is also a simple conceptual model. Alternatively the lexicon 205 can be conceptualized as layers, a core lexicon layer and an extended lexicon layer, ranked by frequency or priori probability. When a word from the extended lexicon layer is selected from the N-best candidate interface, the frequency or priori probability of the selected word is adjusted to a threshold or other criterion having the effect that the selected word is adjusted to belong to the core layer.

System 10 further enables a user to input parts of a long word separately; system 10 automatically combines partial "sokgraphs" into one that is intended by the user. Word parts can be stems, such as "work" and affixes, such as "ing", or two or more common shorter words whose concatenation forms a long word, such as short+hand in English. The concatenation of several short words into one compound word is more common in some European languages such as Swedish or German.

Concatenations are based on individually recognizing parts involved in the concatenated word. For the case of stem+suffix, the user initially gestures an input pattern 235 for a word that represents the stem, then gestures an input pattern 235 of the suffix. For example for the word "coding", the user initially writes the gesture for "code", then writes the gesture for "ing". For an input trace on the keyboard, the recognition module 220 finds the optimum matches and outputs these matches to an N-best list with strings $S_{(i)}$, $i \in [1, N]$, where a rank i of a string signifies the confidence of the recognition module 220 in the selected string matching input pattern 235. The string with the rank i=1 is the top choice of the recognition module 220. The recognition module 220 stores the last N-best list in a temporary buffer. The buffered N-best list for a regular word (stem) is denoted as $S_0$.

Figure 6:
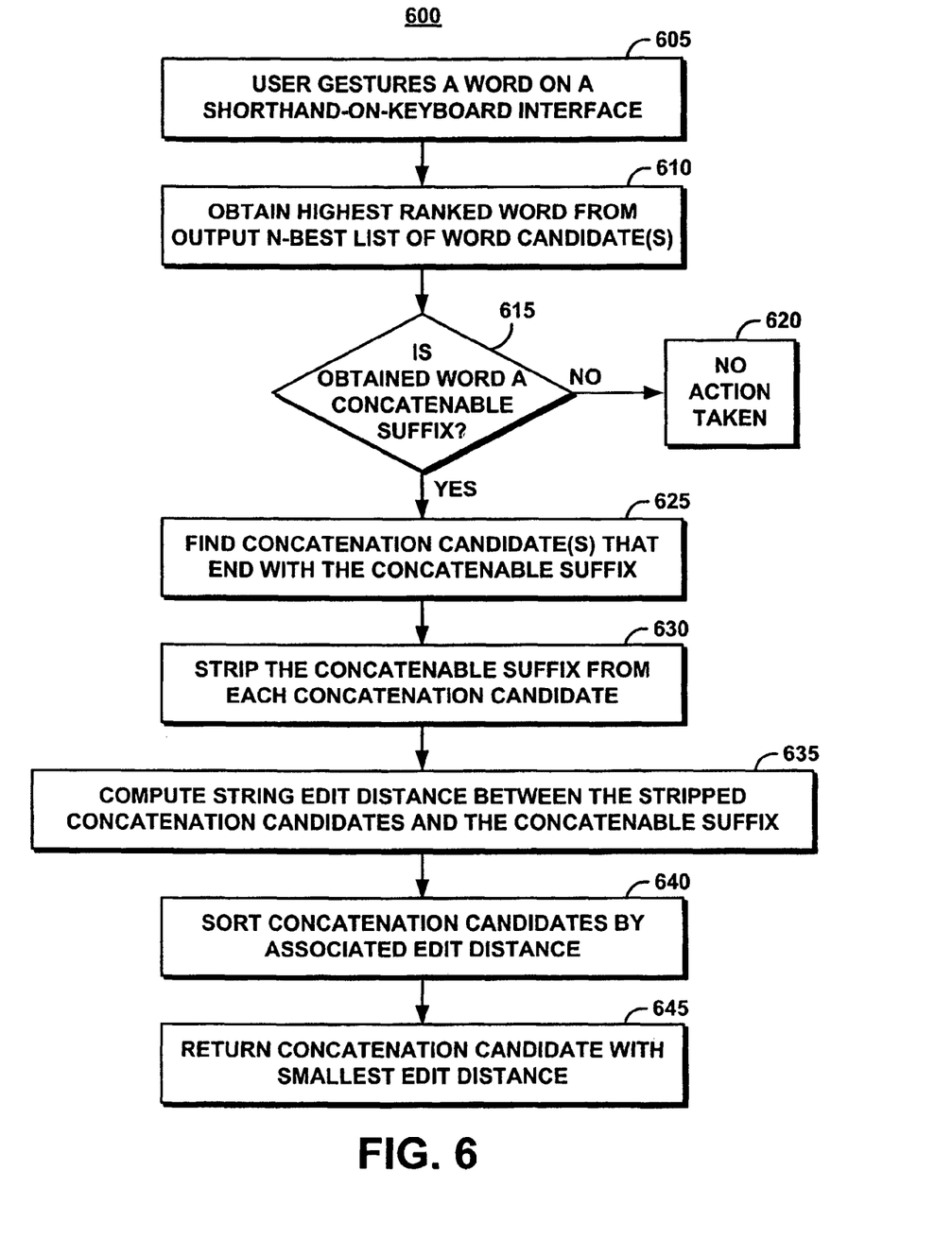
FIG. 6 is a process flow chart illustrating a method of operation of the word pattern recognition system of FIGS. 1 and 2 in recognizing a word candidate as a suffix or a prefix and concatenating the recognized prefix or suffix to a recognized word in a language appropriate manner.

In one embodiment, suffixes are stored in a list called concatenable suffixes whose sokgraphs, the geometric pattern on a graphical keyboard, are represented in the same way as a common word sokgraph. For example, for the suffix "ing", its sokgraph is a continuous trace starting from the i key to the n key ending on the g key. The system recognizes an input pattern 235 for sokgraph "ing" in the same way as any other sokgraph, except the suffix "ing" is stored in the list of concatenable suffixes. Alternatively both suffixes and regular words can be stored in the same lexicon, but with an identifier differentiating the suffix from the regular word. In one embodiment, concatenable suffixes are stored in a lookup table in which each suffix entry, such as "ing", is associated with a series of pointers that point to the entries in a lexicon that ends with that suffix FIG. 6 illustrates a method 600 of system 10 in combining concatenable suffixes with a stem word. A user gestures a word on a shorthand-on-keyboard interface (step 605). The concatenation module 245 obtains a highest ranked word for an output N-best list of word candidates 240 (step 610). The concatenation module 245 determines whether the obtained word is a concatenable suffix by, for example, comparing the obtained word with a list of concatenable suffixes (decision step 615). If the obtained word is not a concatenable suffix, the concatenation module 245 takes no action (step 620).

If the obtained word is a concatenable suffix, the concatenation module 245 finds concatenation candidates that end with the determined concatenable suffix (step 625). The concatenation module 245 strips the concatenable suffix from each concatenation candidate (step 630). Words ending with a current suffix (e.g. "ing") are denoted as $S_{1(i)}$ (e.g. coding or working) and their remainders stripped of the suffix are denoted $S_{2(i)}$ (e.g. "cod" or "work").

The concatenation module 245 computes the string edit distance (specifically: the Morgan editing error using the Wagner-Fisher algorithm) between the stripped concatenation candidates and the concatenable suffix (step 635). The remainders $S_{2(i)}$ are then matched against the top choice $S_{0(1)}$ in the buffered N-best list. Since $S_0$ contains whole words, not fragments of words (for example $S_{0(1)}$=code) the matching is inexact. System 10 uses edit-distance (the minimum number of edit operations chosen from insertion, deletion, or substitution of a single character) to match two strings) to find the string in $S_{2(i)}$(i=1,N) that is closest to $S_{0(i)}$ and denote it as $S_{2\ min}$. The concatenation module 245 sorts the concatenation candidates by the associated edit distance (step 640). The concatenation module 245 returns the concatenation candidate with the smallest edit distance (step 645).

In an alternative embodiment word frequencies or prior probabilities, or higher-order language regularities are used to rank concatenation candidates that share the same edit distance.

The word corresponding to $S_{2\ min}$ in $S_{1(i)}$) is returned as the concatenation candidate of choice. For example "code" is closer by edit-distance to "cod" (the stripped part of "coding") than "code" to "work" (the stripped part of "working"). In one embodiment, a threshold can be set as the lowest acceptable edit-distance mismatch.

In another embodiment suffixes are not linked to all words that end with the suffix. Instead, when a suffix is recognized, the system 10 scans the lexicon 205, finds words that end with the recognized suffix, strips the ending from the found words, matches the stripped remainders with the preceding word, and selects the closest match for concatenation as previously described. The difference between these two embodiments lies in computational time and memory space tradeoff. Scanning the lexicon implies that a separate list of pointers is not needed, hence reducing the storage requirement of the lexicon in the medium the software code is accessing. On the other hand, scanning the lexicon requires more time than to locate a word than a system comprising a lexicon that is indexed with a separate list of pointers.

System 10 treats prefix+stem in a manner similar to stem+suffix. The concatenation module 245 initially recognizes a prefix-based word from the output of the ranked list of word candidates 240 from either a separate list of prefixes or a common lexicon with a prefix identifier. The concatenation module 245 then recognizes the word that follows the prefix. The concatenation module 245 matches all words containing the prefix, strips the matched word of the prefix, and returns the closest match for concatenation.

The concatenation of two shorter words into a long one is not deterministic. For example, in Swedish both "smoke free" and "smokefree" are permitted, but their meanings are opposite (smoking allowed as opposed to smoking not allowed). The compound word module 250 uses a statistical and interactive method to handle the concatenation of two words. To support this method, system 10 stores in the lexicon 205 the statistical information including the frequencies of all words (based on the total number of occurrence of each word in a corpus of text) and frequencies of all bigrams (based on the total number of occurrence of two ordered words).

Figure 7:
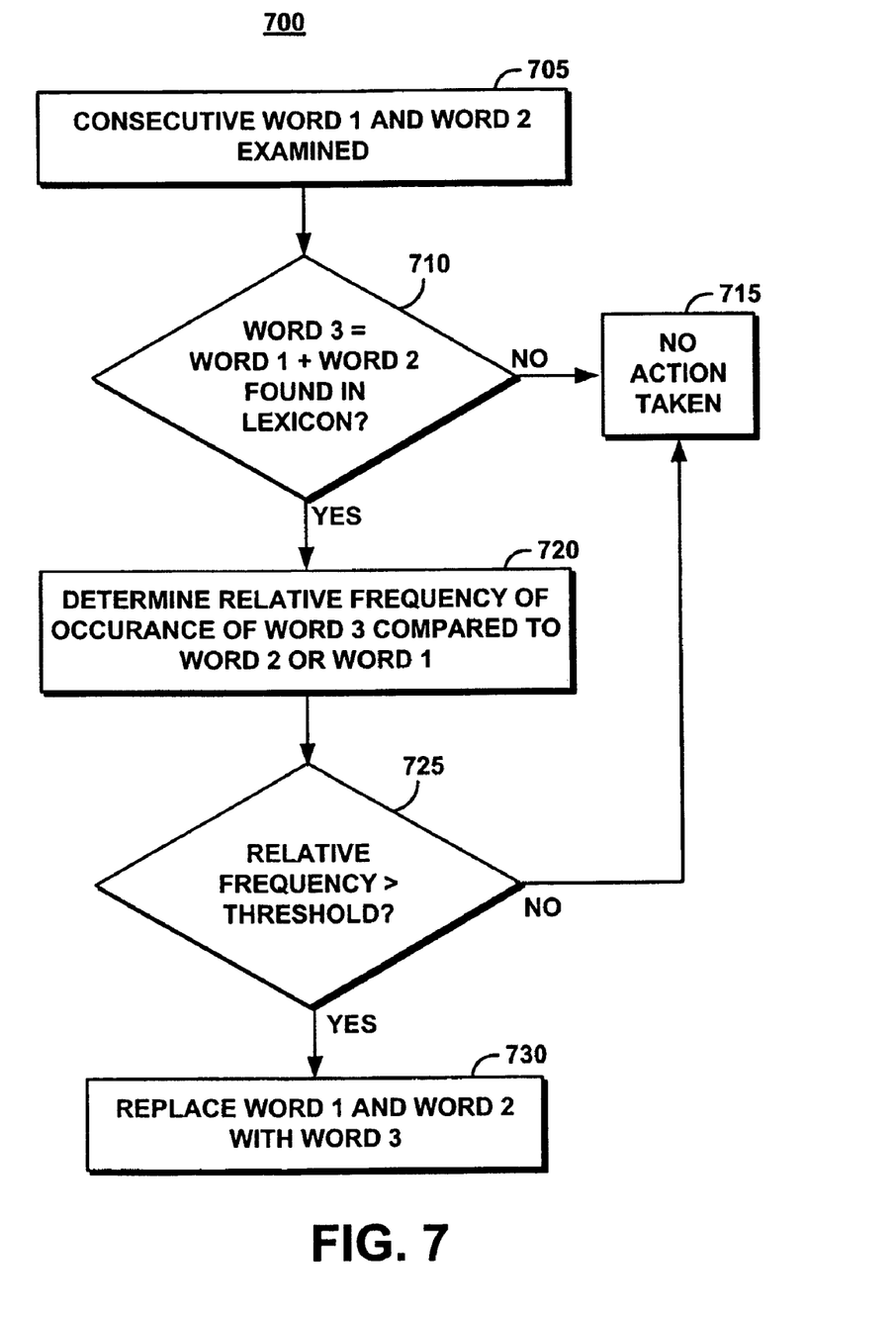
FIG. 7 is a process flow chart illustrating a method of operation of the word pattern recognition system of FIGS. 1 and 2 in combining words into a compound word.

FIG. 7 illustrates a method 700 of system 10 in combining words into compound words. Method 700 examines pairs of consecutive words (word 1, word 2) (step 705). The compound word module 245 determines whether the combined consecutive words (word 1+word 2=word 3) are found in the lexicon 205 (decision step 710). If the combined word, word 3, is not found, the compound word module 250 takes no action (step 715). If a match (word 3=word 1+word 2) is found, the compound word module 250 compares the frequency of word 3 with bigram (word 1, word 2) (step 720). If the frequency of word 3 is greater than the frequency of bigram (word 1, word 2) compared to a predetermined threshold or the ratio of the frequency of word 3 with respect to the frequency of bigram (word 1, word 2) is greater than a predetermined threshold (decision step 725), the compound word module replaces word 1 and word 2 with word 3 (step 730). Otherwise, no action is taken (step 715). Alternatively, the comparison of the frequency of word 3 and the frequency of the bigram (word 1, word 2) is a weighted comparison.

Figure 8A:
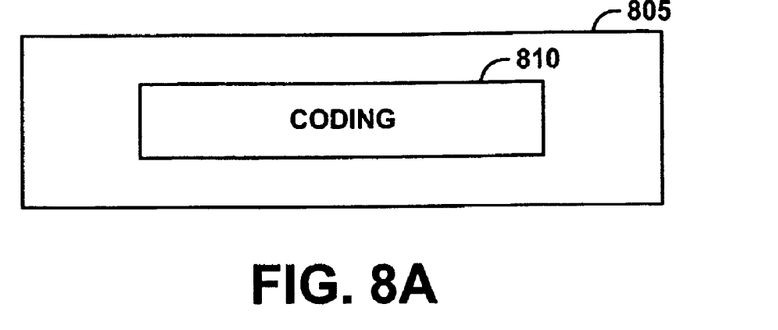
FIG. 8 is comprised of FIGS. 8A, 8B, and 8C and represents a diagram illustrating a menu of the word pattern recognition system of FIGS. 1 and 2 in which the menu enables a user to split a compound word into a stem and a suffix.
Figure 8B:
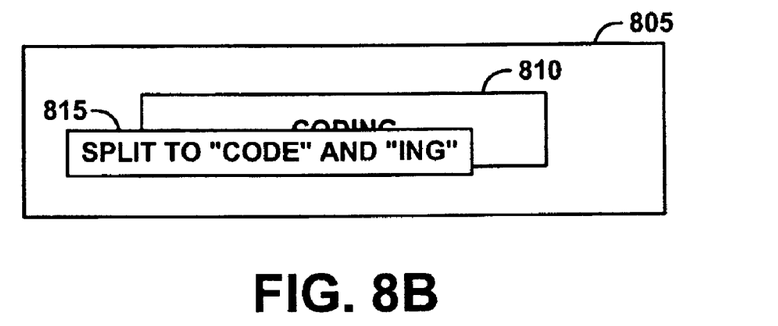
Figure 8C:
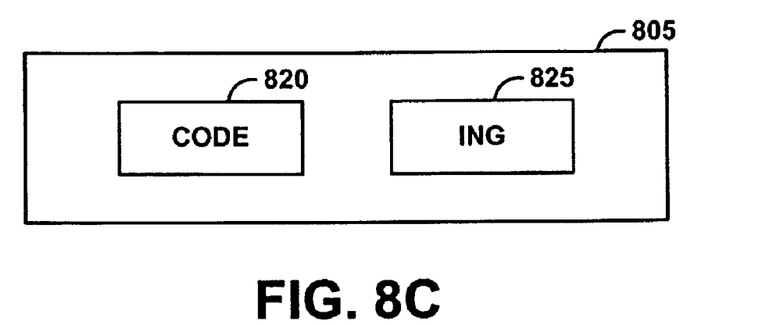

System 10 provides a user interface that enables user interaction for adjusting concatenation and decoupling. FIG. 8 (FIGS. 8A, 8B, 8C) illustrates decoupling of a combined word into two individual words or parts of words. An exemplary screen 805 displays to a user an exemplary concatenated word "coding" 810. The user selects the displayed concatenated word "coding" by, for example, clicking on the word "coding" 810 (FIG. 8A). Selecting the word "coding" 810 displays a menu option 815 comprising, for example, selectable instruction "Split to "Code" and "ing"" or an equivalent option (FIG. 8B). If the user selects the instruction shown in menu option 815, system 10 splits the displayed concatenated word "coding" 810 into stem "code" 820 and suffix "ing" 825 (FIG. 8C).

Figure 9:
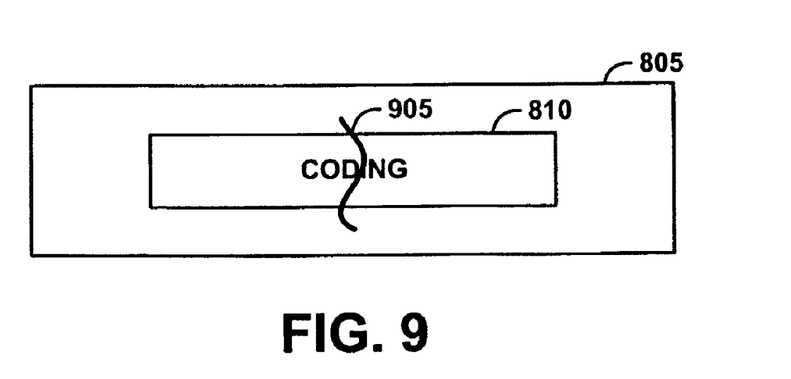
FIG. 9 is a diagram illustrating a pen gesture formed by a user on a compound word presented by the word pattern recognition system of FIGS. 1 and 2 in which the pen gesture splits a compound word into a stem and a suffix.

FIG. 9 illustrates an exemplary alternative pen trace motion 905 used to split the concatenated word "coding" 810. The screen 805 displays to the user a concatenated word "coding" 810. The user forms the pen trace motion 905 over the concatenated word "coding" 810. System 10 splits the displayed concatenated word "coding" 810 into stem "code" 820 and suffix "ing" 825 as illustrated in FIG. 8C.

Figure 10A:
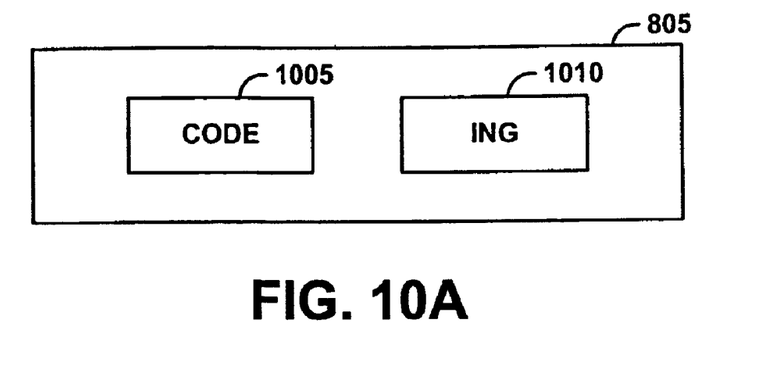
FIG. 10 is comprised of FIGS. 10A, 10B, and 10C and represents a diagram illustrating a menu of the word pattern recognition system of FIGS. 1 and 2 in which the menu is applied to a stem to enable a user to combine a stem and a suffix into a compound word.
Figure 10B:
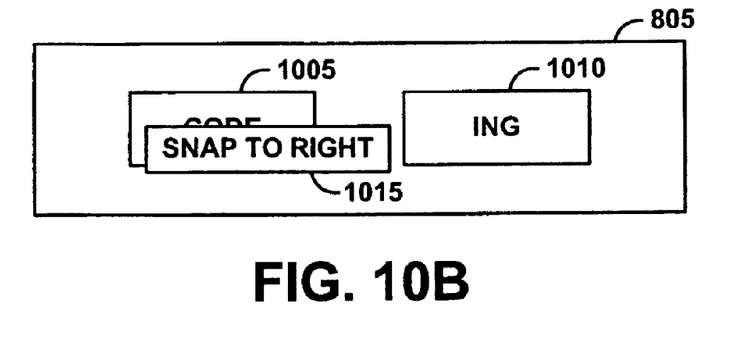
Figure 10C:
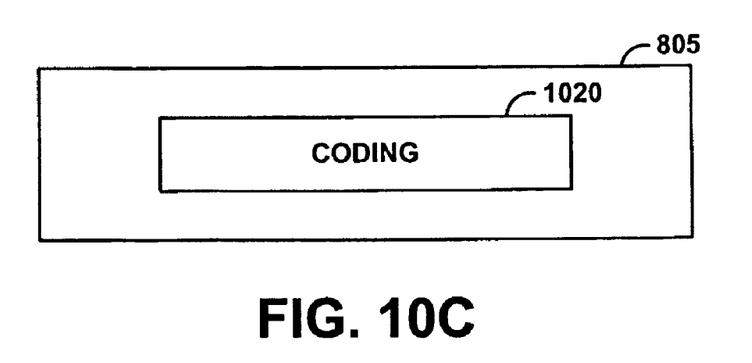

For concatenable words with no action due to low confidence, a menu option is embedded in word 1 and word 2 as illustrated in FIG. 10. For example, the screen 805 displays to the user a word 1 "code" 1005 and a word 2 "ing" 1010 as shown in FIG. 10A. Selecting the word 1 "code" 1005 displays an option menu 1015 comprising a selectable instruction "snap to right" or an equivalent option (FIG. 10B). If the user selects the instruction "snap to right" shown in the option menu 1015, system 10 concatenates the word 1 "code" 1005 and the word 2 "ing" 1010, forming the concatenated word "coding" 1020 (FIG. 10C).

Figure 11:
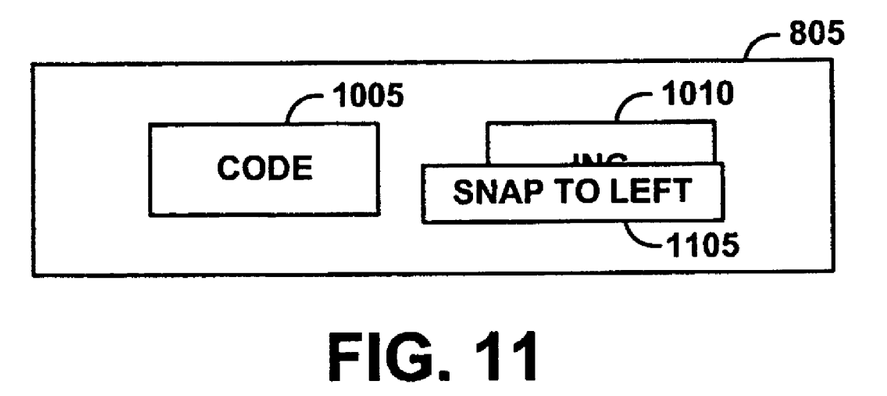
FIG. 11 is a diagram illustrating a menu of the word pattern recognition system of FIGS. 1 and 2 in which the menu is applied to a suffix enabling a user to combine a stem and a suffix into a compound word.

FIG. 11 illustrates an exemplary option menu 1105 displayed when the user selects the word 2 "ing" 1010. If the user selects the instruction "snap to left" shown in the option menu 1105, system 10 concatenates the word 1 "code" 1005 and the word 2 "ing" 1010, forming the concatenated word "coding" 1020 as shown in FIG. 10C.

Figure 12:
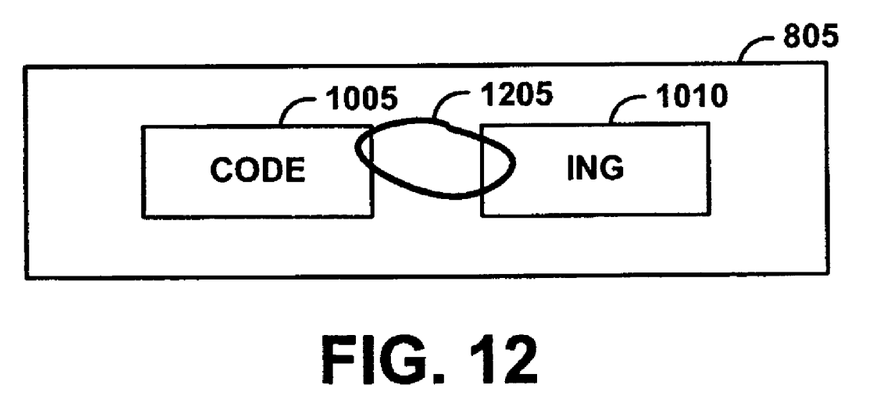
FIG. 12 is a diagram illustrating a pen gesture formed by a user on a stem and a suffix presented by the word pattern recognition system of FIGS. 1 and 2 in which the pen gesture combines the stem and the suffix into a compound word.

FIG. 12 illustrates an exemplary alternative pen trace motion 1205 used to concatenate the word 1 "code" 1005 and the word 2 "ing" 1010. The pen trace motion 1205 comprises, for example, a circle crossing the word 1 "code" 1005 and the word 2 "ing" 1010. System 10 recognizes the command represented by the pen trace motion 1205 and concatenates the word 1 "code" 1005 and the word 2 "ing" 1010, forming the concatenated word "coding" 1020 as shown in FIG. 10C.

It is to be understood that the specific embodiments of the invention that have been described are merely illustrative of certain applications of the principle of the present invention. Numerous modifications may be made to the system and method for improving text input in a shorthand-on-keyboard interface described herein without departing from the spirit and scope of the present invention.

What is claimed is:

1. A system for recognizing an input signal entered via a shorthand-on-keyboard interface and for allowing a stem and an affix of an input text to be combined, the system comprising:
    a memory;
    a concatenation module stored on the memory that is configured, when executed, to recognize the input signal as an input affix,
        wherein the concatenation module further recognizes a candidate word as a neighboring candidate word;
    a compound word module stored on the memory that is configured, when executed, to retrieve a set of words in a lexicon containing the input affix;
    a ranking module stored on the memory that is configured, when executed, to rank the set of words containing the input affix according to a similarity function that compares each lexicon word in the set of words containing the input affix, with a string containing the candidate word and the input affix, and
    wherein the compound word module outputs a highest ranked lexicon word in the set of words containing the input affix; and
    a module stored on the memory that is configured, when executed, to separately display at least two words or affixes and concatenate the at least two words or affixes in response to a circular motion touching inner edges of the at least two words or affixes,
        wherein the at least two words or affixes correspond to the candidate word and the input affix.

2. The system of claim 1, wherein the input affix is a suffix.

3. The system of claim 2, wherein the compound word module compounds the suffix and the highest ranked lexicon word.

4. The system of claim 1, wherein the input affix is a prefix.

5. The system of claim 4, wherein the compound word module compounds the prefix and the highest ranked lexicon word.

6. The system of claim 4, wherein the similarity function includes a distance function.

7. The system of claim 4, wherein the neighboring candidate word includes any one of a candidate word that precedes the input affix or a candidate word that succeeds the input affix.

8. The system of claim 7, wherein if the input text is not recognized as the input affix, the compound word module creates a string resulting from a concatenation of the input text and the neighboring candidate word; determines a frequency of occurrence of the string in the lexicon; compares the frequency of occurrence of the string to frequencies of occurrence of the input text and the neighboring candidate word separately; and if the frequency of occurrence of the string exceeds the frequencies of occurrence of the input text and the neighboring candidate word separately, the compound word module concatenates the input text and the neighboring candidate word as a concatenated word, and replaces the string with the concatenated word.

9. The system of claim 8, wherein a comparison of the frequency of occurrence of the string relative to the frequencies of occurrence of the input text and the neighboring candidate word is a weighted comparison.

10. The method of claim 9, further comprising compounding the affix and the highest ranked lexicon word.

11. A method for recognizing input text entered via a shorthand-on-keyboard interface and for allowing a stem and an affix of the input text to be combined, the method comprising:
    recognizing, by a computing system, the input text as an input affix;
    if the input text is recognized as the input affix, recognizing, by the computing system, a candidate word as a neighboring candidate word;
    retrieving, by the computing system, a set of words in a lexicon containing the input affix,
        wherein the lexicon is stored in a computer database;
    ranking, by the computing system, the set of words containing the input affix according to a similarity function by comparing each lexicon word in the set of words containing the input affix, with a string containing the candidate word and the input affix;
    outputting, on an output display, a highest ranked lexicon word in the set of words containing the input affix;
    displaying, on the output display, the highest ranked lexicon word and displaying split words with two separately displayed words framed in square boxes,
        wherein the two separately displayed words correspond to the candidate word and the input affix.

12. A computer program product having program codes stored on a non-transitory computer-usable medium for recognizing an input signal and for allowing a stem and an affix of an input text to be combined, comprising:
    a program code for recognizing the input signal as an input affix, and for further recognizing a candidate word as a neighboring candidate word;
    a program code for retrieving a set of words in a lexicon containing the input affix;
    a program code for ranking the set of words containing the input affix according to a similarity function that compares each lexicon word in the set of words containing the input affix, with a string containing the candidate word and the input affix;
    a program code for outputting a highest ranked lexicon word in the set of words containing the input affix;
    a program code for displaying the highest ranked lexicon word and displaying split words with two separately displayed words framed in square boxes,
        wherein the two separately displayed words correspond to the candidate word and the input affix.

* * * * *